No. 845,353. PATENTED FEB. 26, 1907.
M. W. HIBBARD.
FLUID PRESSURE BRAKE SYSTEM.
APPLICATION FILED FEB. 25, 1903.
4 SHEETS—SHEET 1.
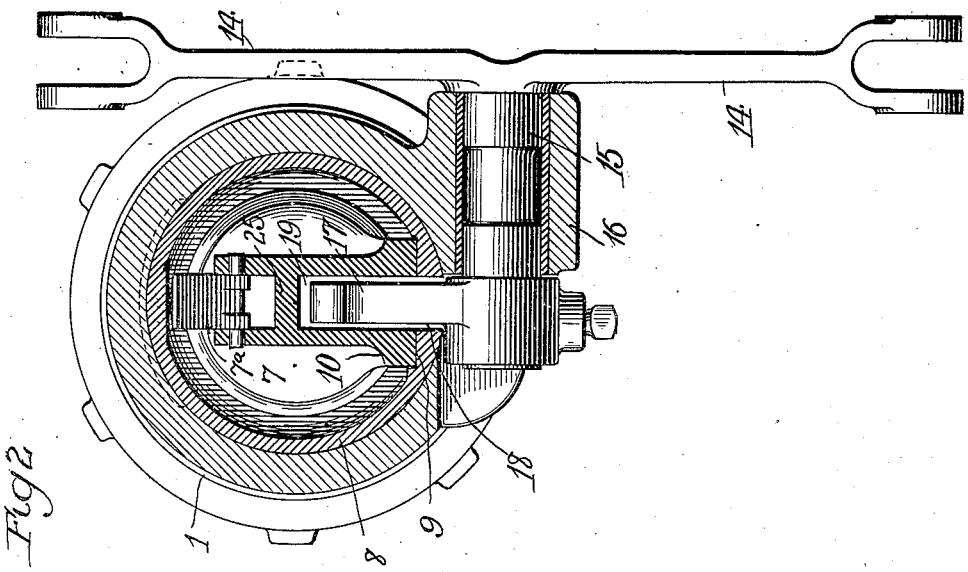
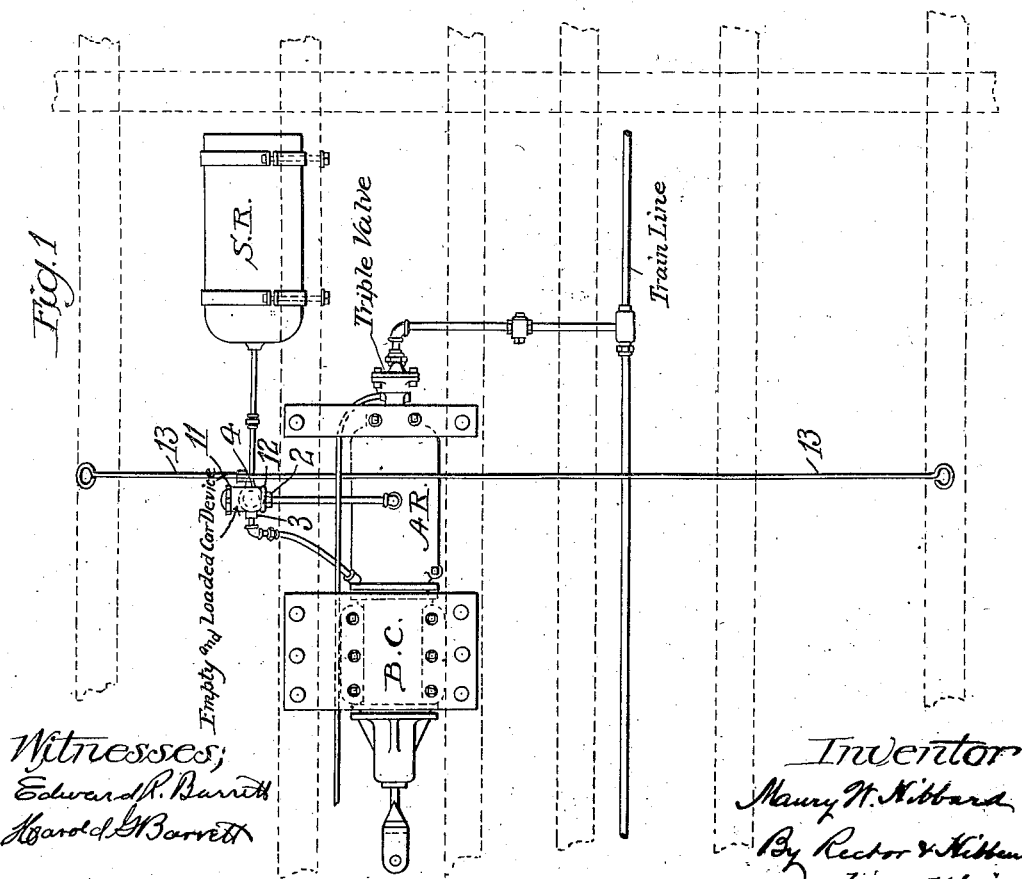
Witnesses:
Edward R. Barrett
Harold G. Barrett
Inventor
Maury W. Hibbard
By Rector & Hibben
his Attys.

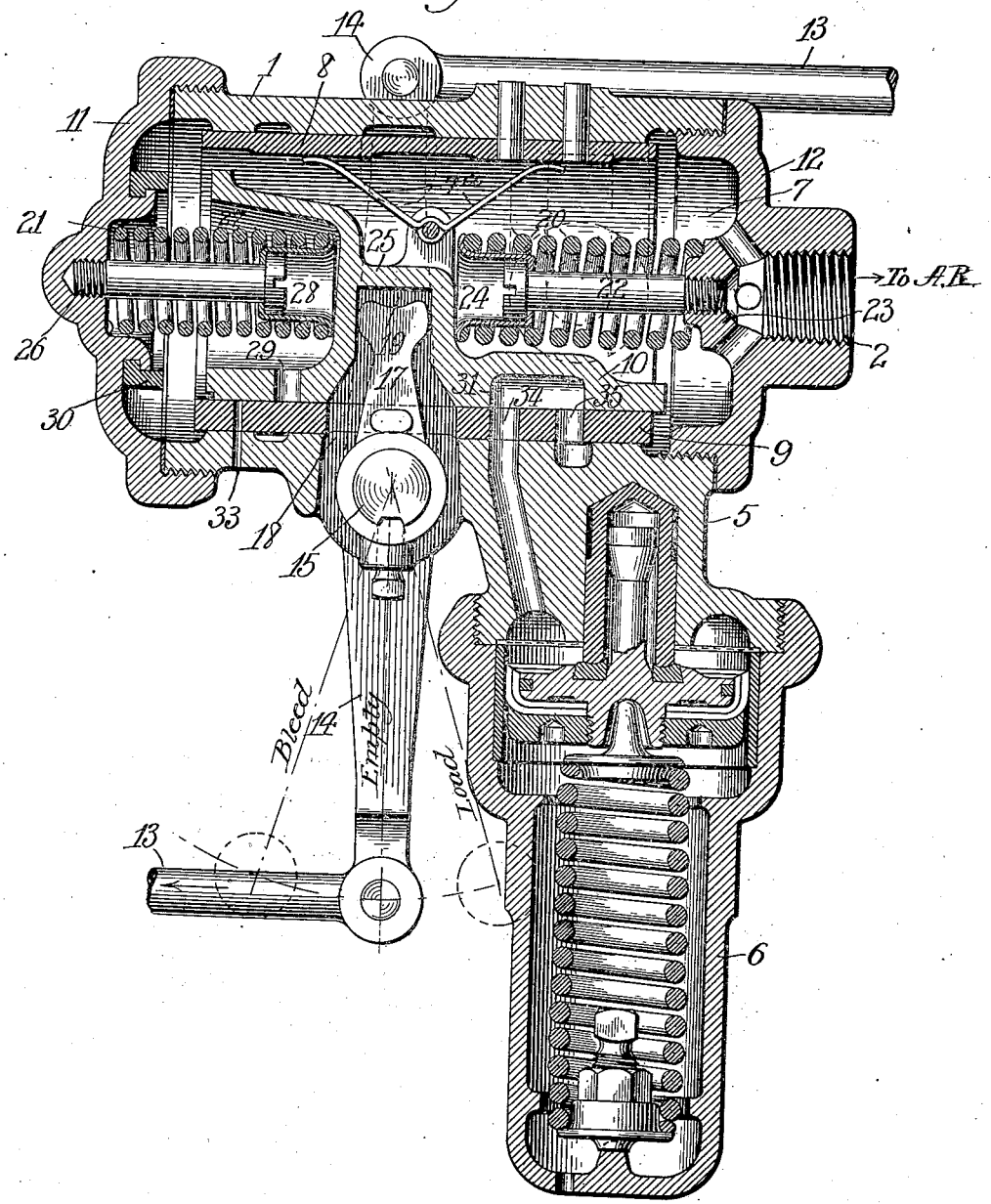

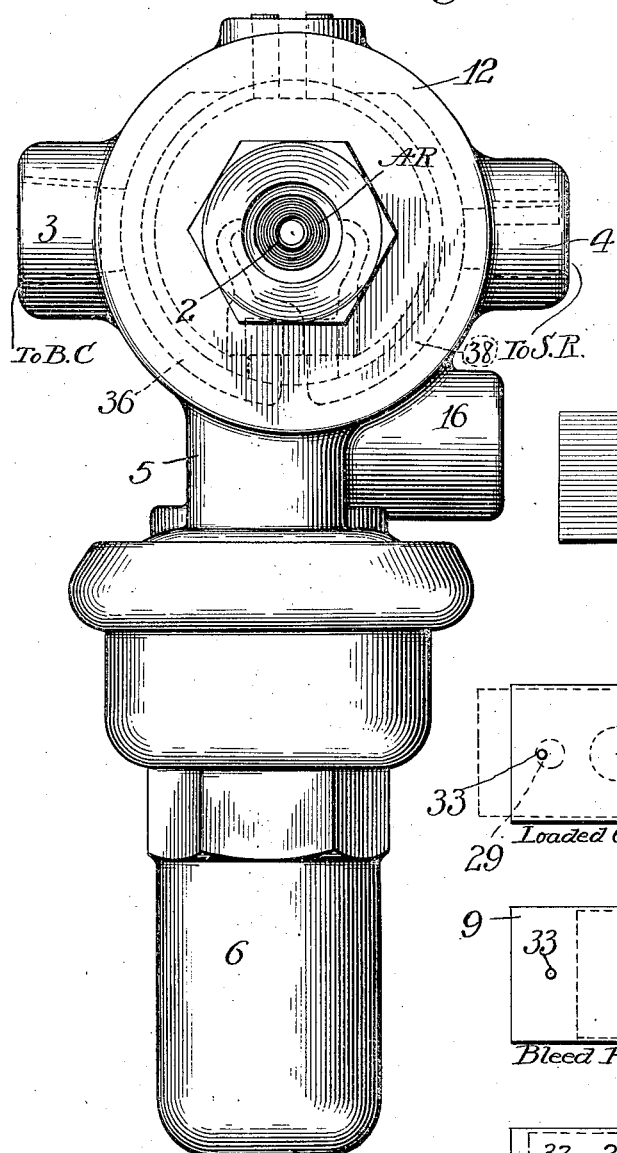
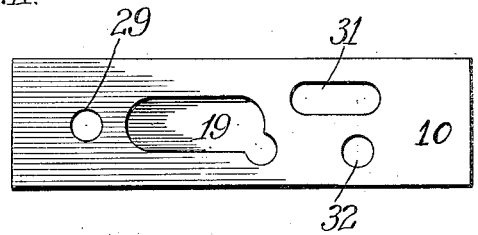
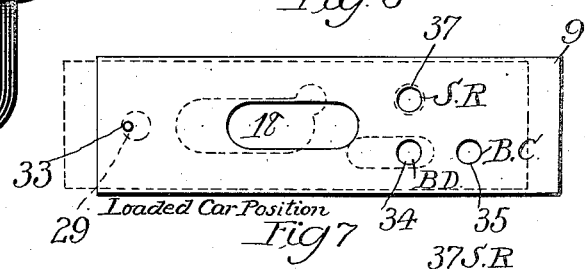
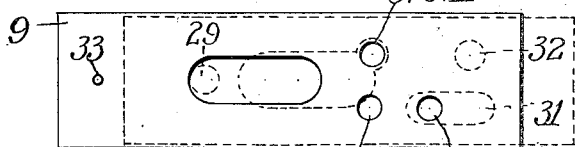
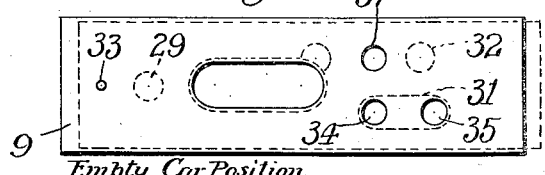

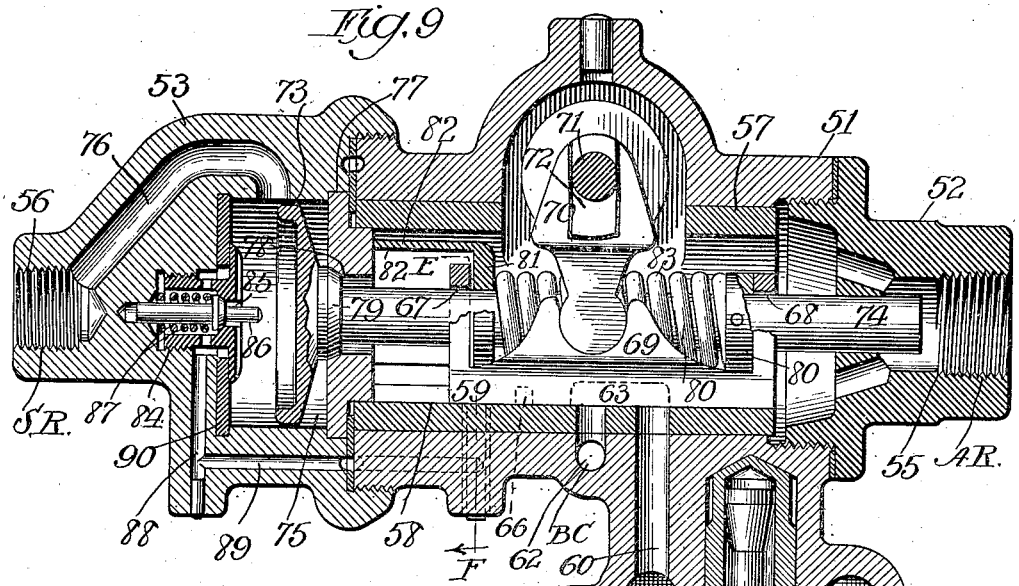

UNITED STATES PATENT OFFICE.

MAURY W. HIBBARD, OF CHICAGO, ILLINOIS, ASSIGNOR TO RICHARD FITZGERALD, OF CHICAGO, ILLINOIS.

FLUID-PRESSURE BRAKE SYSTEM.

No. 845,353.    Specification of Letters Patent.    Patented Feb. 26, 1907.

Application filed February 26, 1903. Serial No. 145,018.

*To all whom it may concern:*

Be it known that I, MAURY W. HIBBARD, residing at Chicago, Cook county, Illinois, have invented certain new and useful Improvements in Fluid-Pressure Brake Systems, of which the following is a specification.

My invention pertains to the same general character and operation of mechanism described in prior Letters Patent of the United States, Nos. 683,205 and 699,386, issued on September 24, 1901, and May 6, 1902, respectively, which mechanism acts in aid of the usual air-brake system and provides a partial brake-pressure for a car empty and a full or increased braking pressure for a car loaded.

Braking force or pressure is based on about seventy per cent. of the light weight of a car, which, especially in respect to the present light-weight high-capacity cars, means only about twenty per cent. of its loaded weight. Consequently the proper proportionate amount of braking is not done on loaded cars equipped with the usual standard brake apparatus. By the use of my mechanism, however, the braking force or pressure as to an empty car is maintained, but considerably increased as to a loaded car, as high as, say, about forty per cent. of the loaded weight.

The object of my present invention is to provide for accomplishing the above-described results a novel and efficient mechanism differing somewhat in construction from that of my said prior patents.

As in my prior inventions, the present mechanism is capable of working in mixed trains—that is, trains having both empty and loaded cars, as well as in trains having all loaded or all empty cars, which is not possible with what is known as the "high-pressure control" system, requiring all cars to be loaded when the system is used.

As in the devices of my said prior patents, when a car is loaded my apparatus is designed to be set or adjusted by a trainman to loaded-car position, which is maintained so long as the air-pressure remains on the car. The apparatus is restored in automatic manner to empty-car position whenever the brake system is no longer charged with air-pressure—that is to say, the empty-car position is the normal one—and the apparatus is automatically restored to that position soon after the car is set out from a train, because of the well-known fact that in such cases the brake system of a detached car does not stay charged with air-pressure, wherefore in actual practice my apparatus will not remain set after the car is unloaded, and hence sliding of wheels on empty cars is impossible. My present arrangement is also designed to release or "bleed" the auxiliary reservoir, and thereby perform the function of the usual release-valve or "bleeder," which may therefore be dispensed with.

In the drawings, Figure 1 is a plan view of the well-known parts of an air-brake equipment of a car, illustrating a form of relative arrangement of my valve apparatus; Fig. 2, a cross-section of the valve taken on line A B of Fig. 3; Fig. 3, a sectional elevation of the valve apparatus; Fig. 4, an elevation thereof; Fig. 5, a face view of the main valve; Figs. 6, 7, and 8, detail views of the valve-seat and valve, illustrated "loaded-car," "bleed," and "empty-car" positions, respectively; Fig. 9, a sectional elevation of a modified form of valve apparatus; Fig. 10, a section taken on line C D of Fig. 11 with the slide-valve removed and showing the valve-seat and ports opening thereon; and Fig. 11, a section on line E F of Fig. 9.

My valve device or apparatus works in connection with the usual air-brake system and also a supplemental reservoir and may have the relative arrangement shown in Fig. 1. In the present instance this valve device comprises a casing 1, having the following connections: A connection 2 communicating with the auxiliary reservoir A R, a connection 3 with the brake-cylinder B C, and a connection 4 with the supplemental reservoir S R. The casing also has a downwardly-extending boss or projection 5, to which is attached or connected the pressure-regulating valve or "blow-down" 6, B D. This regulating-valve may be of suitable and approved construction for the purpose intended, and as the valve herein illustrated is the same as that shown in my said prior patent, No. 699,386, a description thereof is unnecessary.

The valve-casing has an interior chamber 7, provided with a bushing 8, whose lower portion forms a valve-seat 9 for the main valve 10. The chamber is closed at opposite ends by the end caps 11 and 12, suitably secured to the valve-casing, the latter of which contains the connection 2, communicating with the auxiliary reservoir. The main valve 10 may be suitably operated, and in the present instance the same is worked or adjusted by rods 13, extending to the sides of the car and corresponding to and taking the place of the usual bleed-rods, as in my said prior patents. As shown, these rods are pivotally connected to opposite ends of a lever 14, which is formed with or secured to a short shaft 15, arranged to move or rock in a bearing 16 on the under side of the valve-casing. This shaft carries near its inner end an arm 17, which projects through an opening 18 in the valve-seat and into the valve-chamber, where it engages or is received by a socket 19 formed in the main valve. The position of the parts shown in the drawings is empty-car position, which is the normal position maintained in suitable manner, as by the two springs 20 and 21, the former being somewhat heavier or stronger than the latter for a purpose hereinafter made apparent. Spring 20 surrounds a stationary rod or bolt 22, secured or screwing into the spider portion 23 of the end cap 12 and abuts at one end against such spider portion and at the other against a flanged cup 24. The cup is free to slide to the right, Fig. 3, upon the rod or bolt, but the head of the latter, which is contained with the cup, limits the movement of such cup to the left. This cup which bears with a yielding pressure against the raised portion or projection 25, formed by the socket 19 of the valve, is at the limit of left-hand movement when the valve is in the normal or empty-car position illustrated in Fig. 3. The lighter or weaker spring 21 is similarly arranged, the same being correspondingly associated with a rod or bolt 26 and a cup 27, which simply abuts against the valve when in normal position, but does not at such time exert any pressure thereon. The object of spring 20 is to restore the valve to normal position after movement to the right, Fig. 3, while the object of spring 21 is to restore such valve to that position after movement to the left, but only when permitted by the air-lock or controller device hereinafter described.

The air-lock or controller is compactly arranged within the same casing as the main valve and in the present instance is formed as a part thereof. This lock or controller is on the left-hand end of the valve, which is made in the form of a cup 28, whose outer edges are arranged to seat (when the valve is moved to the left) in such manner as to close the interior of such cup from the valve-chamber 7, whereby the pressure in such chamber will serve to hold the valve in such shifted left-hand position after the air-pressure has been vented from the interior of such cup through a vent-port 29, as hereinafter explained. In the present construction this cup 28 is arranged to seat upon a seat or gasket 30, of rubber or other suitable material, secured to the end cap 11.

Referring to Fig. 5, the main valve has in addition to said vent-port 29 and the socket or opening 19 a recess 31 and a supplemental reservoir-port 32. This valve, with its ports and recess, slides on the valve-seat and governs certain ports and passages opening thereon comprising a vent-passage 33, adapted to coöperate with vent-port 29, a port 34 marked B D communicating with the blow-down device, a port 35 marked B C communicating with the brake-cylinder passage or nozzle 3 through a curved passage 36 in the valve-casing, Fig. 4, and a port 37 marked S R communicating with the supplemental reservoir-nozzle 4 through a curved passage 38 in such valve-casing.

Starting with the parts in normal or empty-car position, as shown in Fig. 3, the operation of the mechanism will now be explained. At this time the main valve is in its intermediate position, with its recess 31 connecting the two ports 34 and 35, thereby putting the brake-cylinder in communication with the blow-down device or pressure-regulator, with the result that the brake-cylinder pressure is properly regulated in service action by releasing excess pressure above a predetermined amount and in emergency action by reducing the high pressure thus obtained in the brake-clyinder to this predetermined amount and proportionately to the decrease in speed of the car. When the car is loaded, the trainman operates either one of the rods 13 by pushing it inward, with the result that the main valve is shifted to the left, Fig. 3— that is, to loaded-car position—at which time the communication between the brake-cylinder and blow-down device through ports 34 and 35 is cut off and communication established between the valve-chamber 7 and the supplemental reservoir through ports 32 and 37, whereby both the auxiliary and supplemental reservoirs are brought into communication, and the volume of available braking pressure is increased to the extent of the capacity of the supplemental reservoir. At the same time the air-lock or controller-cup 28 is caused to seat on gasket 30, and immediately upon such seating the port 29 is brought into register with vent-passage 33, and the air-pressure within such cup vented or exhausted, with the result that the pressure within the valve-chamber pressing against the right-hand face, Fig. 3, of the cup will hold the valve to its shifted position against the tension of the spring 21, which is compressed in the operation. Consequently as long as the air-pressure in the valve-chamber exceeds the tension of this spring 21— that is, practically as long as the car equipment remains charged with air-pressure—the main valve will be thus automatically held or locked in loaded car position, and the restoration of such valve will occur in automatic manner as soon as the spring 21 is able to exert its tension to move such valve back to its intermediate position of normal. (Shown in Fig. 3.) When it is desired to bleed, the trainman pulls either one of the rods 13 in the usual manner, and thereby shifts the main valve to the right, Fig. 3, with the result that port 29 is brought into register with the slot 18 in the valve-seat, and the reservoir-air is permitted to escape freely to the atmosphere. The pressure is also enabled to exhaust through the vent-passage 33. When the pull on the rod is released, the spring 20 restores the working parts to normal position. This spring is preferably of greater power than spring 21 for the purpose of quickly and positively restoring the parts after being moved to bleed position, so that it is unnecessary for the trainman to close the valve by hand. The spring 21 need not be of any considerable power, just sufficient to restore the parts, and the same is made as light as possible, lest it should release the lock and return the main valve at a time when the valve-chamber was charged with considerable pressure. As hereinbefore stated, the air-pressure in the valve-chamber works against and overcomes the spring 21 when the valve is moved to loaded-car position, and as it is desired to hold of lock the valve in that position until substantially all the air-pressure in the car system, except, say, about ten pounds has escaped, the spring should only be sufficient to restore the parts to their normal position. The spring 7ª pressing upon the slide-valve is employed more particularly for the purpose of keeping the valve upon its seat during the shipment or installation, and thereby preventing dirt and grit from getting between the valve and its seat. My device thus provides an efficient and compact arrangement of parts, all contained within a single casing and closely associated for the performance of their functions. Moreover, the valve-seats may be made of metal, preferably brass, and rubber gaskets, and the like, which are objectionable in railroad service, dispensed with.

In the construction of valve mechanism above described the supplemental reservoir as well as the auxiliary reservoir is bled in the "bleeding" operation; but to avoid any possible objection that may arise to the bleeding of the supplemental reservoir at this time a suitable closing-valve under the control of the main valve may be provided for cutting off communication between the two reservoirs when the main valve is shifted or moved to bleed position. The closing-valve might be embodied in the structure already described, but I have chosen to embody it in the modified form of valve mechanism shown in Fig. 9 in order to at the same time illustrate a modification of the main-valve operating mechanism and of the vent mechanism for the locking mechanism for the main valve. I will now proceed to describe this modification by reference to Figs. 9, 10, and 11 of the drawings. This modified device comprises a casing 51, having end caps 52 and 53 and containing a valve-chamber 54. The cap 52 has a passage 55 communicating with the auxiliary reservoir A R and the cap 53 a passage 56 communicating with the supplemental reservoir S R. The valve-chamber has a bushing 57, in which is formed a valve-seat 58, on which the main valve 59 travels. On the valve-seat terminates a port or passage 60, communicating with a blowdown 61 B D similar to the one hereinbefore referred to and arranged to be connected in empty-car position with the brake-cylinder port or passage 62 B C by means of a recess 63 in the face of the main valve. The passage 63 leads to the brake-cylinder in suitable manner by proper piping. The valve-seat also has a vent-port 64 and an exhaust-port 65, used for a purpose hereinafter made apparent, which ports are controlled by a cross-recess 66 in the main valve.

The main valve 59 has upturned end flanges 67 and 68 and also side flanges 69, each having a socket in which bear depending arms of an operating-lever 70. An operating-stem 71, having a web 72, fitting into a vertical slot in the lever 70, enters the side of the valve-casing at a point above the main valve, all as clearly shown in Fig. 9. When the operating-lever is in its upright position, as shown in the drawings, the main valve is in normal or empty-car position. When such lever is actuated in one direction, its depending arm is rotated toward the left, Fig. 9, and the main valve is also moved in that direction to loaded-car position. Likewise when such lever is actuated in the opposite direction the main valve is moved to the right, Fig. 9, to bleed position. This lever is connected to and operated by rods extending to opposite sides of the car in substantially the same way as the lever or actuating rod or shaft of the construction hereinbefore described. In this modified form of construction now being described the automatic valve-locking device operates on the same general principle as the one shown in Fig. 3; but such modified device instead of being integral with the main valve is physically independent, but operatively connected and associated with the main valve and arranged in the same structure or casing. This modified valve-locking device here consists of a flanged disk or cup 73, having a stem 74, extending longitudinally of the valve-chamber 54 and passing loosely through the valve-flanges 67 and 68. The disk 73 operates in a chamber 75, formed in the end cap 53 and communicating with the supplemental reservoir through the passage 76, leading to the passage 56. This supplemental reservoir-chamber 75 is separated from the valve-chamber 54 by a diaphragm 77, having a central bore or opening 78, provided with a valve-seat for the valve 79, formed on the back of the disk or cup 73 at the junction between it and its stem. When, therefore, the automatic lock is in the position indicated in Fig. 9, the valve 79 acts as a check-valve to prevent the supplemental-reservoir air from passing to the main-valve chamber and escaping therefrom when the bleed-port is open.

The stem 74 is secured to a ring or collar 80, arranged adjacent to and inside the valve-flange 68 and passes freely through a plate or collar 81 adjacent the other valve-flange 67, which plate is provided with a lateral flange 82, adapted to substantially contact a part of the casing, or, as shown, the diaphragm 77. A coiled spring 83 surrounds the stem 74 and abuts at one end the collar 80 and at its other end the plate 81, with the result that the main valve and the automatic lock as well are kept in the normal position, as shown, but permitted to be shifted or moved as hereinafter explained.

The supplemental reservoir-chamber 75 is provided with a small valve-chamber in which is fitted a flanged bushing 84, having a passage 85, governed by a valve 86. This valve is normally held seated by a coiled spring 87, and thereby closes communication between chamber 75 and the vertical passage 88 and horizontal passage 89, the latter of which leads to the vent-port 64, opening on the face of the valve-seat.

Starting with the parts in the normal position, as shown, the main valve brings the blow-down device in coöperative relation with the brake-cylinder and closes the two ports 64 and 65. The air-pressure is fed from the train-pipe to the auxiliary reservoir in the usual manner and passes through the valve-chamber 54 and into the supplemental reservoir, the valve-lock device being capable of moving sufficiently to permit the air to pass by its valve 79. The car can now be braked with a force sufficient for an empty car, and greater pressure than a predetermined amount is prevented by the blow-down device. For loaded-car braking the trainman shifts the main valve to the left, Fig. 9, whereupon the blow-down device is cut out of service and the passages 86, 88, 89, and 64 vented to atmosphere through bleed or exhaust port 65 by means of the recess 66 in the main valve, whose shifting brings this recess into register with ports 64 and 65. At substantially the same time the disk 73 of the valve-lock is moved to the left and its flange caused to seat upon the gasket-seat 90. About the time that this disk is seating it strikes the inwardly-projecting stem of the small valve, which is thereby unseated, and the air-pressure within the flanged disk vented to atmosphere through passages 88, 89, and 64, recess 66, and port 65, with the result that the valve-lock device, and consequently the main valve, are held to shifted position—that is, loaded-car position—by the pressure of the air upon the right-hand face, Fig. 9, of the disk 73. Both reservoirs are now in free communication, and the available braking pressure is augmented to the extent of the capacity of the supplemental reservoir, so that increased braking pressure is obtained as compared with the braking-pressure for an empty car. The valve-lock is held to loaded-car position against the tension of the spring 83, which is compressed, inasmuch as the spring abutment or collar 80 moves with the stem 74, and the other abutment 81 is stopped by contact of its flange 82 against diaphragm 77 when the ports are adjusted to loaded-car position, as explained. Hence after the car has remained set out of a live train for unloading purposes or otherwise or whenever the car equipment has ceased to be charged with air-pressure, whether loaded or unloaded, the spring 83 will automatically restore the parts to empty-car position—that is, normal position. Thus my device is not dependent upon the trainman for restoration to normal position, and the same is true of the other device herein described, as well as that of my prior patent, No. 699,386. Consequently there is no danger of sliding or skidding the wheels of a car whose valve device was adjusted for load or which was unloaded and picked up empty. To bleed the auxiliary reservoir, the operating-rods are actuated to move the main valve to the right, Fig. 9, whereby the bleed-port 65 is uncovered and the auxiliary reservoir-pressure exhausted to the atmosphere. At this time the valve portion 79 of the valve-lock device is held seated and the supplemental reservoir cut off from communication with the valve-chamber 54, wherefore the auxiliary reservoir may be bled without bleeding the supplemental reservoir. When the main valve is thus moved to the right, the valve-flange 67 will carry the spring-plate 81 to the right and compress the spring 83, inasmuch as the collar or plate 80 is stationary at this time. When the pull on the operating rods and lever is relieved, this spring will return the parts to normal position.

The locking disk or cup acts in the manner of a piston, inasmuch as it is acted upon in loaded-car braking by the pressure in the valve-chamber, which holds it seated during this time. The disk is normally exposed on both sides or faces to the pressure in such chamber, but continually exposed to that pressure on one side only, inasmuch as in loaded-car position of the parts the pressure on the other side of the piston-like disk is vented or relieved, thereby permitting the pressure of the valve-chamber to act on one side of the disk against atmospheric pressure on the other. So far as the broad idea of this feature of operation is concerned the precise construction and arrangement of parts shown is immaterial, for it is evident that the locking device may be differently constructed and arranged elsewhere than in the valve-chamber itself or in substantially direct connection with the valve, so long as the described functions are performed. However, to obtain the advantage of simplicity and compactness I prefer to construct and arrange the parts as shown. Furthermore, after the disclosure herein of the means for disconnecting the two reservoirs during the bleeding operation it is evident that the form of valve mechanism illustrated in Fig. 3 may be provided with means for such purpose.

To avoid any possibility of a too rapid feeding of the supplemental reservoir and a consequent depletion or considerable reduction in the pressure in the valve-chamber and auxiliary reservoir, which reduction might be such as that the air-pressure remaining would be insufficient to hold the locking device to loaded-car position when so adjusted, suitable means may be employed in the passage to the supplemental reservoir to restrict the rate of feed or charging thereof—such as, for instance, any of the restricting means described and claimed in my application for improvements in fluid-pressure brakes filed February 24, 1902, Serial No. 95,340, issued as Patent No. 723,386, dated March 24, 1903.

I claim—

1. In combination with an air-brake system and a supplemental reservoir therefor, a device adapted to be adjusted for braking a car in proportion to its empty and its loaded weight, and comprising a casing having a valve arranged to establish communication between the supplemental reservoir and the usual auxiliary reservoir when shifted to loaded-car position, and means arranged within said casing for maintaining the valve in loaded-car position so long as air-pressure remains in the brake system of the car.

2. In combination with an air-brake system and a supplemental reservoir therefor, a device adapted to be adjusted for braking a car in proportion to its empty and its loaded weight and comprising a casing having a valve arranged to establish communication between the supplemental reservoir and the usual auxiliary reservoir when shifted to loaded-car position, and an air lock or controller arranged within said casing and mechanically connected to said valve for maintaining the valve in loaded-car position so long as air-pressure remains in the brake system of the car.

3. In combination with an air-brake system, a device adapted to be adjusted for braking a car in proportion to its empty and its loaded weight and comprising a valve for increasing the volume of braking-pressure for a loaded car, and means arranged on such valve for locking it in loaded-car position.

4. In combination with an air-brake system and a supplemental reservoir therefor, a device adapted to be adjusted for braking a car in proportion to its empty and its loaded weight and comprising a casing having a valve arranged to establish communication between the supplemental reservoir and the usual auxiliary reservoir when shifted to loaded-car position, a cup connected to said valve and arranged to seat when the valve is shifted, and means for venting the space within the cup.

5. In combination with an air-brake system and a supplemental reservoir therefor, a device adapted to be adjusted for braking a car in proportion to its empty and its loaded weight and comprising a casing having a valve arranged to establish communication between the supplemental reservoir and the usual auxiliary reservoir when shifted to loaded-car position, a valve-seat on which such valve works and having a vent-passage, a cup connected to said valve and arranged to seat when the valve is shifted, said cup having a vent-port arranged to register with the vent-passage and thereby exhaust the space within the cup.

6. In combination with an air-brake system and a supplemental reservoir therefor, a device adapted to be adjusted for braking a car in proportion to its empty and its loaded weight and comprising a casing having a valve arranged to establish communication between the supplemental reservoir and the usual auxiliary reservoir when shifted to loaded-car position, a seat 30 in one end of the casing, a cup formed at one end of the valve and arranged to seat on seat 30 when such valve is shifted and means for venting the interior of the cup.

7. In combination with an air-brake system and a supplemental reservoir therefor, a device adapted to be adjusted for braking a car in proportion to its empty and its loaded weight and comprising a casing having a valve arranged to establish communication between the supplemental reservoir and the usual auxiliary reservoir when shifted to loaded-car position, a cup connected to said valve and arranged to seat when the valve is shifted to loaded-car position, means for venting the space within the cup, and a spring arranged within such cup and tending to resist such shifting of the valve.

8. In combination with an air-brake system and a supplemental reservoir therefor, a device adapted to be adjusted for braking a car in proportion to its empty and its loaded weight and comprising a casing having a valve arranged to establish communication between the supplemental reservoir and the usual auxiliary reservoir when shifted to loaded-car position, a cup connected to said valve and arranged to seat when the valve is shifted to loaded-car position, means for venting the space within the cup, and a spring 21 having a limited movement of extension and tending to resist such shifting of the valve.

9. In combination with an air-brake system and a supplemental reservoir therefor, a device adapted to be adjusted for braking a car in proportion to its empty and its loaded weight and comprising a casing having a valve arranged to establish communication between the supplemental reservoir and the usual auxiliary reservoir when shifted to loaded-car position, a cup connected to said valve and arranged to seat when the valve is shifted to loaded-car position, means for venting the space within the cup, a spring 21 arranged within the cup, a rod 26 secured to one end of the casing, and a flanged spring-cup 27 arranged to slide on said rod and against which one end of the spring bears.

10. In combination with an air-brake system and a supplemental reservoir therefor, a device adapted to be adjusted for braking a car in proportion to its empty and its loaded weight and comprising a casing having a valve arranged to establish communication between the supplemental reservoir and the usual auxiliary reservoir when shifted to loaded-car position, a valve-seat on which such valve works and having a vent-passage 33, an opening 18, and a port 37 to the supplemental reservoir, a cup arranged on said valve and having a vent-port 29 which is adapted to communicate with passage 33 to vent the interior of the cup when the valve is moved to one position and to communicate with opening 18 to bleed the reservoir when moved to anther position.

11. In combination with an air-brake system and a supplemental reservoir therefor, a device adapted to be adjusted for braking a car in proportion to its empty and its loaded weight and comprising a casing having a valve arranged to establish communication between the supplemental reservoir and the usual auxiliary reservoir when shifted to loaded-car position, said valve having an upward projection 25, and a pair of springs arranged on opposite sides of such projection to maintain the valve in an intermediate position of normal but permit positive movement in either direction.

12. In combination with an air-brake system and a supplemental reservoir therefor, a device adapted to be adjusted for braking a car in proportion to its empty and its loaded weight and comprising a casing having a valve arranged to establish communication between the supplemental reservoir and the usual auxiliary reservoir when shifted to loaded-car position, said valve having an upward projection 25 and end cup 28, and a pair of springs having limited extension and arranged on opposite sides of such projection to maintain the valve in an intermediate position of normal but permit positive movement in either direction.

13. In combination with an air-brake system, a reservoir supplemental to the usual auxiliary reservoir, a valve device arranged to be adjusted to connect the two reservoirs, to obtain increased braking force, a controller forming part of the valve device which comprises a valve-casing provided with the slot or opening 18 and a slide-valve 10 within the casing and having socketed side wings, a bearing on said casing, operating-levers 14, a shaft 15 mounted in such bearing and having an arm 17 projecting through said opening and operatively engaging the socketed side wings of the valve.

14. In combination with an air-brake system, a reservoir supplemental to the usual auxiliary reservoir, a valve arranged to be adjusted to connect the two reservoirs to obtain increased braking and a controller forming an integral part of said valve and arranged to hold the valve in adjusted position.

15. In combination with an air-brake system, a reservoir supplemental to the usual auxiliary reservoir of the brake system, and a combined valve and lock therefor to prevent change of such valve after adjustment to a certain position, said valve being arranged to be adjusted to connect the two reservoirs to obtain increased braking force.

16. In combination with an air-brake system, a device adapted to be adjusted for braking a car in proportion to its empty and its loaded weight and comprising a valve for increasing the volume of braking pressure for a loaded car, and means directly controlled by said valve for locking the latter in loaded-car position.

17. In combination with an air-brake system, a device adapted to be adjusted for braking a car in proportion to its empty and its loaded weight and comprising a valve for increasing the volume of braking pressure for a loaded car, and means carried and directly controlled by said valve for locking the latter in loaded-car position.

18. In combination with an air-brake system, a device adapted to be adjusted for braking a car in proportion to its empty and its loaded weight and comprising a valve for increasing the volume of braking pressure for a loaded-car, and means mounted on and movable with the valve for locking the latter in loaded-car position.

19. In combination with an air-brake system, a device adapted to be adjusted for braking a car in proportion to its empty and its loaded weight and comprising a valve for increasing the volume of braking pressure for a loaded car, and means formed integral with the valve for locking the latter in loaded-car position.

20. In combination with an air-brake system, a device adapted to be adjusted for braking a car in proportion to its empty and its loaded weight and comprising a valve for increasing the volume of braking pressure for a loaded car, and means carried at one end of the valve for locking the latter in loaded-car position.

21. In combination with an air-brake system, a device adapted to be adjusted for braking a car in proportion to its empty and its loaded weight and comprising a casing having a valve-chamber, a valve therein for increasing the volume of braking pressure for a loaded car, and means arranged in said chamber and directly controlled by said valve for locking the latter in loaded-car position.

22. In combination with an air-brake system, a device adapted to be adjusted for braking a car in proportion to its empty and its loaded weight and comprising a casing having a valve-chamber, a valve therein for increasing the volume of braking pressure for a loaded car, and means arranged within such valve-chamber and mounted on and movable with said valve for locking the latter in loaded-car position.

23. In combination with an air-brake system, a device adapted to be adjusted for braking a car in proportion to its empty and its loaded weight and comprising a casing having a valve-chamber, a valve therein for increasing the volume of braking pressure for a loaded car, and means arranged in said chamber and actuated by the pressure contained therein for holding the valve in loaded-car position.

24. In combination with an air-brake system, a device adapted to be adjusted for braking a car in proportion to its empty and its loaded-weight and comprising a casing having a valve-chamber, a valve therein for increasing the volume of braking-pressure for a loaded car, and means arranged in said chamber and mounted on said valve for holding the latter in loaded-car position, said holding means being actuated by the pressure contained in said chamber.

25. In combination with an air-brake system, a device adapted to be adjusted for braking a car in proportion to its empty and its loaded weight and comprising a casing having a valve-chamber, a valve therein for increasing the volume of braking pressure for a loaded car, a holding disk or cup exposed to the pressure of the system and coöperating with the valve, such disk or cup being arranged to seat when the valve is moved to loaded-car position, and means for venting the interior of the disk or cup after seating, whereby the pressure will hold the disk and valve to said adjusted position.

26. In combination with an air-brake system, a device adapted to be adjusted for braking a car in proportion to its empty and its loaded weight and comprising a casing having a valve-chamber, a valve therein for increasing the volume of braking pressure for a loaded car, a holding disk or cup continually exposed to the pressure of the system and operatively connected with the valve, such disk or cup being arranged to seat when the valve is moved to loaded-car position, and means for venting the interior of the cup after seating and thereby permitting the said pressure to hold such cup seated.

27. In combination with an air-brake system, a device adapted to be adjusted for braking a car in proportion to its empty and its loaded weight and comprising a casing having a valve-chamber, a valve therein for increasing the volume of braking pressure for a loaded car, a holding-disk continually exposed on one side to the pressure of the system and operatively connected with the valve, and means for venting the pressure on the other side of the disk to permit the said pressure to act and hold the disk and valve to loaded-car position.

28. In combination with an air-brake system, a device adapted to be adjusted for braking a car in proportion to its empty and its loaded weight and comprising a casing having a valve-chamber, a valve therein for increasing the volume of braking pressure for a loaded car, and a holding-disk continually exposed on one side to the pressure of the system and operatively connected with the valve, said valve having means for venting or relieving the pressure on the other side of the disk to permit the said pressure to act and hold the disk and valve to loaded-car position.

29. In combination with an air-brake system, a device adapted to be adjusted for braking a car in proportion to its empty and its loaded weight and comprising a casing having a valve-chamber, a valve therein for increasing the volume of braking pressure for a loaded car, a holding-disk continually exposed on one side to the pressure of said chamber and operatively connected with said valve, and means for venting the pressure from the other side of the disk when the valve is adjusted to loaded-car position.

30. In combination with an air-brake system, a device adapted to be adjusted for braking a car in proportion to its empty and its loaded weight and comprising a casing having a valve-chamber, a valve therein for increasing the volume of braking pressure for a loaded car, a holding-disk normally exposed on both sides to the pressure of said chamber but continually exposed to such pressure only as to one side, said disk being operatively connected with said valve, and means for relieving the pressure from the other side of the disk when the valve is adjusted to loaded-car position.

31. In combination with an air-brake system and a supplemental reservoir therefor, integral controlling and locking means for connecting said supplemental reservoir with the usual auxiliary reservoir of the brake system and for maintaining said means in an adjusted position.

32. In combination with an air-brake system and a supplemental reservoir therefor, means for connecting said supplemental reservoir of the brake system, a locking device carried by said means and tending to hold such means in an adjusted position, and a casing for containing such means and locking device.

33. In combination with an air-brake system and supplemental reservoir therefor, a single means for connecting said supplemental reservoir with the usual auxiliary reservoir of the brake system and for maintaining said connection.

34. In combination with an air-brake system and supplemental reservoir therefor, a single means for connecting said supplemental reservoir with the usual auxiliary reservoir of the brake system at the will of the operator and for maintaining said connection.

35. In combination with an air-brake system and supplemental reservoir therefor, a single means for connecting said supplemental reservoir with the usual auxiliary reservoir of the brake system at the will of the operator and for maintaining said connection as determined by the pressure on the car.

36. In combination with an air-brake system and a supplemental reservoir therefor, means for connecting said supplemental reservoir with the usual auxiliary reservoir of the brake system at the will of the operator and for holding and locking said means in an adjusted position, said connecting and locking means being integral.

37. In combination with an air-brake system and a supplemental reservoir therefor, means for connecting said supplemental reservoir with the usual auxiliary reservoir of the brake system, and a locking device controlled by the pressure on the car for holding said means in an adjusted position, said means and locking device being formed integral.

38. In combination with an air-brake system and a supplemental reservoir therefor, means for connecting said supplemental reservoir with the usual auxiliary reservoir of the brake system at the will of the operator, and a locking device tending to hold such means in an adjusted position as determined by the presence of air-pressure on the car, said means and locking device being integral.

39. In combination with an air-brake system and a supplemental reservoir, means for controlling the flow of air to and from such reservoir and a locking device for holding said means in adjusted position, said means and locking device being formed as a unitary structure.

40. In combination with an air-brake system and a supplemental reservoir, means for controlling the flow of air to and from such reservoir at the will of the operator, and a locking device arranged to hold or lock said means in an adjusted position as determined by the presence of air-pressure on the car, said means and locking device being formed as a unitary structure.

MAURY W. HIBBARD.

Witnesses:
S. E. HIBBEN,
LOUIS B. ERWIN.